United States Patent
Wang et al.

(10) Patent No.: US 12,045,204 B2
(45) Date of Patent: Jul. 23, 2024

(54) SMALL IN-MEMORY CACHE TO SPEED UP CHUNK STORE OPERATION FOR DEDUPLICATION

(71) Applicant: VMware, Inc., Palo Alto, CA (US)

(72) Inventors: Wenguang Wang, Santa Clara, CA (US); Junlong Gao, Mountain View, CA (US); Marcos K. Aguilera, Palo Alto, CA (US); Richard P. Spillane, Mountain View, CA (US); Christos Karamanolis, Los Gatos, CA (US); Maxime Austruy, Lausanne (CH)

(73) Assignee: VMware, Inc., Palo Alto, CA (US)

( * ) Notice: Subject to any disclaimer, the term of this patent is extended or adjusted under 35 U.S.C. 154(b) by 392 days.

(21) Appl. No.: 16/552,976

(22) Filed: Aug. 27, 2019

(65) Prior Publication Data
US 2021/0064581 A1   Mar. 4, 2021

(51) Int. Cl.
| | |
|---|---|
| *G06F 15/16* | (2006.01) |
| *G06F 16/13* | (2019.01) |
| *G06F 16/172* | (2019.01) |
| *G06F 16/174* | (2019.01) |
| *G06F 9/455* | (2018.01) |

(52) U.S. Cl.
CPC ........ *G06F 16/1752* (2019.01); *G06F 16/137* (2019.01); *G06F 16/172* (2019.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,990,810 A | 11/1999 | Williams |
| 6,154,147 A | 11/2000 | Gabrielle et al. |
| 7,925,615 B1 | 4/2011 | Sutton, Jr. et al. |
| 8,140,821 B1 | 3/2012 | Raizen et al. |

(Continued)

FOREIGN PATENT DOCUMENTS

| | | |
|---|---|---|
| AU | 2013206404 A1 | 7/2013 |
| WO | 2010036754 A1 | 4/2010 |

OTHER PUBLICATIONS

Sorting a HashMap according to keys in Java. https://www.geeksforgeeks.org, 2018, pp. 1-7 . (Year: 2018).*

(Continued)

*Primary Examiner* — Alex Gofman
*Assistant Examiner* — Shelly X Qian
(74) *Attorney, Agent, or Firm* — King Intellectual Asset Management

(57) ABSTRACT

The present disclosure provides techniques for deduplicating files. The techniques include creating a cache or subset of a large data structure. The large data structure organizes information by random hash values. The random hash values result in a random organization of information within the data structure, with the information spanning a large number of storage blocks within a storage system. The cache, however, is within memory and is small relative to the data structure. The cache is created so as to contain information that is likely to be needed during deduplication of a file. Having needed information within memory rather than in storage results in faster read and write operations to that information, improving the performance of a computing system.

20 Claims, 5 Drawing Sheets

(56) References Cited

U.S. PATENT DOCUMENTS

| | | | |
|---|---|---|---|
| 8,370,297 B2 | 2/2013 | Anglin et al. | |
| 8,539,148 B1 | 9/2013 | Chen et al. | |
| 8,732,403 B1 | 5/2014 | Nayak | |
| 9,298,723 B1 | 3/2016 | Vincent | |
| 9,372,879 B1 | 6/2016 | Evenson | |
| 9,424,285 B1 | 8/2016 | Condict et al. | |
| 9,430,331 B1 | 8/2016 | Basov et al. | |
| 9,633,033 B2 | 4/2017 | Vijayan et al. | |
| 9,715,434 B1 | 7/2017 | Xu et al. | |
| 9,824,095 B1 | 11/2017 | Taylor et al. | |
| 9,946,724 B1 | 4/2018 | Ghosh et al. | |
| 10,037,337 B1 | 7/2018 | Shanmuganathan | |
| 10,075,291 B1 | 9/2018 | Molaro et al. | |
| 10,108,543 B1 | 10/2018 | Duggal et al. | |
| 10,108,544 B1 | 10/2018 | Duggal et al. | |
| 10,108,634 B1 | 10/2018 | Pal | |
| 10,496,611 B1 | 12/2019 | Singh | |
| 10,762,051 B1 | 9/2020 | Bhagavandas et al. | |
| 10,795,812 B1 | 10/2020 | Duggal et al. | |
| 11,323,513 B1 | 5/2022 | Vibhor et al. | |
| 2002/0154010 A1 | 10/2002 | Tu et al. | |
| 2005/0060643 A1 | 3/2005 | Glass et al. | |
| 2006/0089936 A1 | 4/2006 | Chalker | |
| 2007/0038658 A1 | 2/2007 | Ghosh | |
| 2007/0116025 A1 | 5/2007 | Yadlon et al. | |
| 2008/0144079 A1 | 6/2008 | Pandey et al. | |
| 2009/0049260 A1 | 2/2009 | Upadhyayula | |
| 2009/0307251 A1 | 12/2009 | Heller et al. | |
| 2010/0077013 A1 | 3/2010 | Clements et al. | |
| 2010/0082672 A1 | 4/2010 | Kottomtharayil et al. | |
| 2010/0088296 A1 | 4/2010 | Periyagaram et al. | |
| 2010/0174881 A1 | 7/2010 | Anglin et al. | |
| 2010/0223441 A1* | 9/2010 | Lillibridge | G06F 3/0631 711/165 |
| 2010/0281081 A1 | 11/2010 | Stager et al. | |
| 2010/0299490 A1 | 11/2010 | Attarde et al. | |
| 2010/0333116 A1 | 12/2010 | Prahlad et al. | |
| 2011/0078458 A1 | 3/2011 | Furukawa et al. | |
| 2011/0122255 A1 | 5/2011 | Haritaoglu | |
| 2011/0185149 A1 | 7/2011 | Gruhl et al. | |
| 2011/0246741 A1* | 10/2011 | Raymond | G06F 16/137 711/170 |
| 2011/0276744 A1 | 11/2011 | Sengupta et al. | |
| 2012/0150823 A1 | 6/2012 | Tofano | |
| 2012/0158709 A1 | 6/2012 | Gaonkar et al. | |
| 2012/0191675 A1 | 7/2012 | Kim et al. | |
| 2012/0311339 A1 | 12/2012 | Irvine | |
| 2013/0018851 A1* | 1/2013 | Jayaraman | G06F 3/0641 707/692 |
| 2013/0060739 A1 | 3/2013 | Kalach et al. | |
| 2013/0339317 A1 | 12/2013 | Kim et al. | |
| 2014/0188822 A1 | 7/2014 | Das | |
| 2014/0229440 A1 | 8/2014 | Venkatesh et al. | |
| 2014/0229696 A1 | 8/2014 | Feng et al. | |
| 2014/0344195 A1 | 11/2014 | Drew et al. | |
| 2015/0205816 A1 | 7/2015 | Periyagaram et al. | |
| 2015/0261776 A1 | 9/2015 | Attarde et al. | |
| 2015/0261792 A1 | 9/2015 | Attarde et al. | |
| 2015/0379430 A1 | 12/2015 | Dirac et al. | |
| 2016/0078068 A1 | 3/2016 | Agrawal et al. | |
| 2016/0171009 A1 | 6/2016 | Fang et al. | |
| 2016/0299818 A1 | 10/2016 | Vijayan et al. | |
| 2016/0306560 A1 | 10/2016 | Maranna et al. | |
| 2016/0342338 A1 | 11/2016 | Wang | |
| 2016/0350324 A1 | 12/2016 | Wang et al. | |
| 2017/0061138 A1 | 3/2017 | Lambert | |
| 2017/0131934 A1 | 5/2017 | Kaczmarczyk et al. | |
| 2017/0160950 A1 | 6/2017 | Sazawa et al. | |
| 2017/0270135 A1 | 9/2017 | Lambright | |
| 2017/0300550 A1 | 10/2017 | Emberson et al. | |
| 2018/0150562 A1 | 5/2018 | Gundimeda et al. | |
| 2018/0173732 A1 | 6/2018 | Wu et al. | |
| 2018/0314727 A1 | 11/2018 | Epstein et al. | |
| 2020/0133547 A1 | 4/2020 | Armangau et al. | |
| 2020/0134049 A1 | 4/2020 | Bassov et al. | |
| 2020/0249860 A1 | 8/2020 | Faibish et al. | |
| 2020/0310686 A1 | 10/2020 | Truong et al. | |
| 2021/0034578 A1 | 2/2021 | Dalmatov et al. | |
| 2021/0064522 A1 | 3/2021 | Wang et al. | |
| 2021/0064579 A1 | 3/2021 | Wang et al. | |
| 2021/0064580 A1 | 3/2021 | Gao et al. | |
| 2021/0064582 A1 | 3/2021 | Wang et al. | |
| 2021/0064589 A1 | 3/2021 | Wang et al. | |

OTHER PUBLICATIONS

Lexicographic Order. WolframMathWorld, https://mathworld.wolfram.com/LexicographicOrder.html, 2019, pp. 1. (Year: 2019).*

Bonwick, Jeff, ZFS Deduplication. https://blogs.oracle.com/bonwick/zfs-deduplication-v2, Nov. 2, 2009.

Colgrove, John et al., Purity: Building Fast, Highly-Available Enterprise Flash Storage from Commodity Components. In Proceedings of SIGMOD 2015: Industrial Track, May 2015.

Decandia, Giuseppe et al., Dynamo: Amazon's Highly Available Key-value Store. SIGOPS Oper. Syst. Rev., 41 (6):205-220, Oct. 2007.

El-Shimi, Ahmed et al., Primary Data Deduplication—Large Scale Study and System Design. In Presented as part of the 2012 USENIX Annual Technical Conference (USENIX ATC 12), pp. 285-296, Boston, MA, 2012. USENIX.

Gao, Junlong et al., BOSSFS: An Enterprise File Service as Fast as vSAN and as Cheap as S3. In Proceedings of VMware Radio 2018, May 2018.

Gueron, Shay et al., SHA-512/256. In Proceedings of the 2011 Eighth International Conference on Information Technology: New Generations, ITNG '11, pp. 354-358, Washington, DC, USA, 2011. IEEE Computer Society.

Gupta, Abhishek et al., A Highly Concurrent and IO-Parallel B"-Tree. In Proceedings of VMware Radio 2018, May 2018.

Intel. Isa-l performance report release 2.19. https://01.org/sites/default/files/documentation/intel_isa-l_2.19_performance_report_0.pdf, Sep. 29, 2017.

Leung, Andrew W. et al., Measurement and Analysis of Large-Scale Network File System Workloads. In USENIX 2008 Annual Technical Conference, ATC'08, pp. 213-226, Berkeley, CA, USA, 2008. USENIX Association.

Lu, Luke et al., VDFS: A Cloud-Centric Virtual Distributed File System. In Proceedings of VMware Radio 2015, May 2015.

Muthitacharoen, Athicha et al., A Low-bandwidth Network File System. In Proceedings of the Eighteenth ACM Symposium on Operating Systems Principles, SOSP '01, pp. 174-187, New York, NY, USA, 2001. ACM.

Introduction to VMware vSAN, VMware, Apr. 14, 2017. https://www.youtube.com/watch?v=g8S3UT_vvUo.

Patrizio, Andy, IDC: Expect 175 zettabytes of data worldwide by 2025. https://tinyurl.com/y9494x90, Dec. 3, 2018.

Roselli, Drew et al., Characteristics of File System Workloads. Technical Report UCB/CSD-98-1029, EECS Department, University of California, Berkeley, 1998.

Roselli, Drew et al., A Comparison of File System Workloads. Proceedings of 2000 USENIX Annual Technical Conference, ATEC'00, pp. 1-15, San Diego, CA, USA, Jun. 18-23, 2000. USENIX Association.

Stoica, Ion et al., Chord: A Scalable Peer-to-Peer Lookup Service for Internet Applications. SIGCOMM Comput. Commun. Rev., 31(4):149-160, Aug. 2001.

Zaydman, Oleg et al., Teleportation of VM Disk Images over WAN, In Proceedings of VMware Radio 2018, May 2018.

Zhu, Benjamin et al., Avoiding the Disk Bottleneck in the Data Domain Deduplication File System. In Proceedings of the 6th USENIX Conference on File and Storage Technologies, FAST'08, pp. 18:1-18:14, Berkeley, CA, USA, 2008. USENIX Association.

Geer, David, Reducing the Storage Burden via Data Dedupliction, Industry Trends, Dec. 2008, pp. 15-17.

* cited by examiner

SMALL IN-MEMORY CACHE TO SPEED UP CHUNK STORE OPERATION FOR DEDUPLICATION

RELATED APPLICATIONS

This application is related to U.S. application Ser. No. 16/552,880, titled "SCALE OUT CHUNK STORE TO MULTIPLE NODES TO ALLOW CONCURRENT DEDUPLICATION," U.S. application Ser. No. 16/552,908, titled "A PROBABILISTIC ALGORITHM TO CHECK WHETHER A FILE IS UNIQUE FOR DEDUPLICATION," U.S. application Ser. No. 16/552,954, titled "EFFICIENT GARBAGE COLLECTION OF VARIABLE SIZE CHUNKING DEDUPLICATION," U.S. application Ser. No. 16/552,965, titled "FAST ALGORITHM TO FIND FILE SYSTEM DIFFERENCE FOR DEDUPLICATION," and U.S. application Ser. No. 16/552,998, titled "ORGANIZE CHUNK STORE TO PRESERVE LOCALITY OF HASH VALUES AND REFERENCE COUNTS FOR DEDUPLICATION." Each of these applications is filed on the same day as the present application. The entire contents of each of these applications are hereby incorporated by reference herein.

BACKGROUND

The amount of data worldwide grows each year at a rate that is faster than the price drop of storage devices. Thus, the total cost of storing data continues to increase. As a result, it is increasingly important to develop and improve data efficiency techniques, such as deduplication and compression for file and storage systems. Data deduplication works by calculating a hash value for each data unit and then storing units with the same hash only once. However, existing deduplication system usually compromise between space efficiency and speed of data retrieval, and are usually optimized for one or the other.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques for deduplicating files. The techniques include creating a cache or subset of a large data structure. The large data structure organizes information by random hash values. The random hash values result in a random organization of information within the data structure, with the information spanning a large number of storage blocks within a storage system. The cache, however, is within memory and is small relative to the data structure. The cache is created so as to contain information that is likely to be needed during deduplication of a file, as further described below with reference to FIG. 3. Having needed information within memory rather than in storage results in faster read and write operations to that information, improving the performance of a computing system.

The techniques also include creating a data structure that organizes metadata about chunks of files, the organization of the metadata preserving order and locality of the chunks within files. A chunk of a file is a portion of a file, as described further below. Order and locality are further described below with reference to FIG. 1C and FIG. 2. The organization of the metadata within storage blocks of storage devices matches the order of chunks within files. Upon a read or write operation to a metadata, the preservation of locality of metadata results in the likely fetching, from storage into a memory cache, metadata of subsequent and contiguous chunks. The preserved locality results in faster subsequent read and write operations of metadata, because the read and write operations are executed from memory rather than from storage.

Faster read and write operations result in an improvement in the functioning of the computer itself. The computer is able to execute basic read and write operations faster than otherwise. Additionally, an improvement in a deduplication process results in an improvement in the functioning of the computer itself. An improvement in deduplication improves the way a computer stores and retrieves data in memory and in storage. The deduplication techniques herein are directed to a specific implementation of a solution to a problem in the software arts.

Figure 1A:
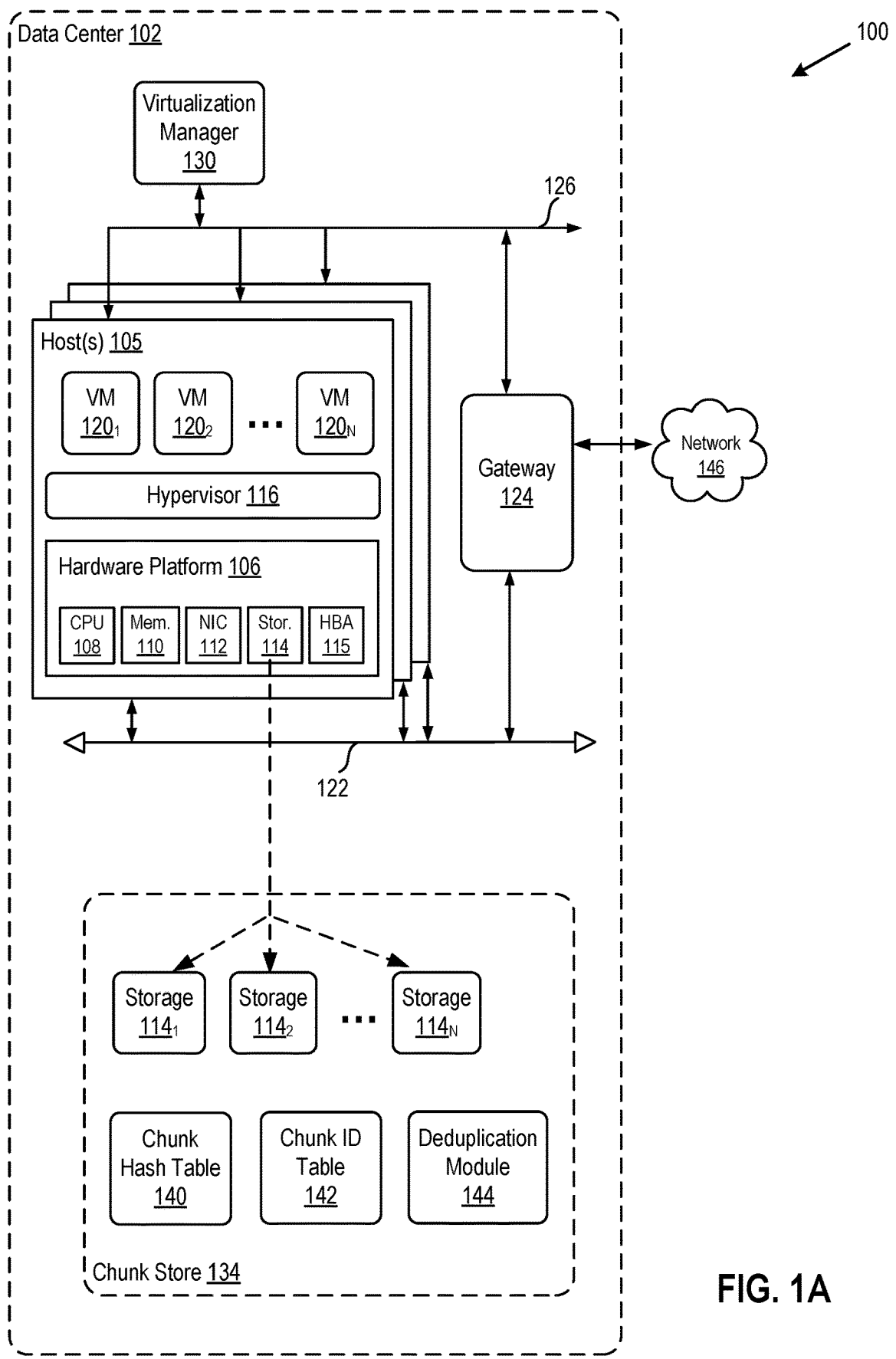
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes a data center 102 connected to a network 146. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, a data network 122, and a chunk store 134. Networks 122, 126, in one embodiment, each provide Layer 2 or Layer 3 connectivity in accordance with the Open Systems Interconnection (OSI) model, with internal physical or software defined switches and routers not being shown. Although the management and data network are shown as separate physical networks, it is also possible in some implementations to logically isolate the management network from the data network, e.g., by using different VLAN identifiers.

Each of hosts 105 may be constructed on a server grade hardware platform 106, such as an x86 architecture platform. For example, hosts 105 may be geographically co-located servers on the same rack.

Hardware platform 106 of each host 105 may include components of a computing device such as one or more central processing units (CPUs) 108, system memory 110, a network interface 112, storage system 114, a host bus adapter (HBA) 115, and other I/O devices such as, for example, USB interfaces (not shown). Network interface 112 enables host 105 to communicate with other devices via a communication medium, such as data network 122 or management network 126. Network interface 112 may include one or more network adapters, also referred to as Network Interface Cards (NICs). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical or software defined network, but different network segments, such as different VLAN segments.

Storage system 114 represents persistent storage devices (e.g., one or more hard disks, flash memory modules, solid state disks, non-volatile memory express (NVMe) drive, and/or optical disks). Storage 114 may be internal to host 105, or may be external to host 105 and shared by a plurality of hosts 105, coupled via HBA 115 or NIC 112, such as over a network. Storage 114 may be a storage area network (SAN) connected to host 105 by way of a distinct storage network (not shown) or via data network 122, e.g., when using iSCSI or FCoE storage protocols. Storage 114 may also be a network-attached storage (NAS) or another network data storage system, which may be accessible via NIC 112.

Figure 1B:
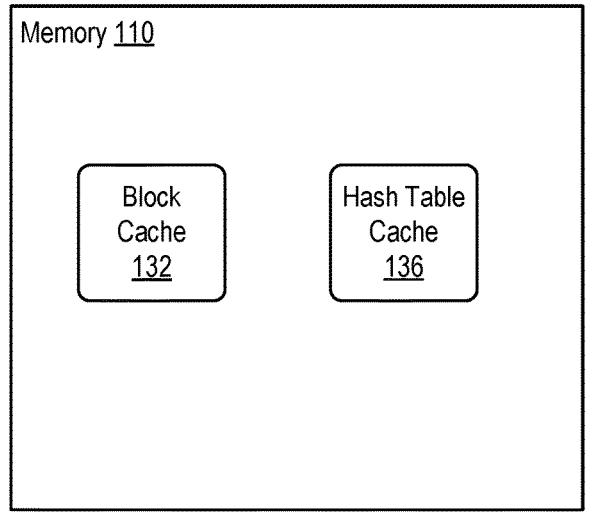
FIG. 1B depicts a block diagram of a cache within a memory of a host machine, according to an embodiment.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Memory 110 also includes a block cache 132 and a hash table cache 136 (see FIG. 1B). Although block cache 132 and hash table cache 136 are shown as located within memory 110, the caches 132, 136 may be implemented in other components of computer system 100, such as in an external storage or memory device, shared by a plurality of hosts 105, and coupled to host 105 via HBA 115 or NIC 112.

Block cache 132 comprises cached copies of storage blocks of storage(s) 114. The cached storage blocks in block cache 132 are fetched into memory 110 during deduplication method 300 discussed below with reference to FIG. 3.

Hash table cache 136 comprises a subset of entries (e.g., key-value mappings) of chunk hash table 140. Entries of chunk hash table 140 are added to hash table cache 136 as per deduplication method 300, discussed below with reference to FIG. 3. The mappings within hash table cache 136 may be organized linearly or may be organized through a data structure that facilitates fast searching of key-value mappings within hash table cache 136. The data structure may be, for example, a hash table that uses a cuckoo hash algorithm to map the keys of chunk hash table 140 to values of chunk hash table 140. Hash table cache 136 may also be organized, for example, as a binary tree, a bucket, a red-black tree, or an Adelson-Velsky-Landis (AVL) tree. Hash table cache 136 may be of a limited size, and may use a cache replacement algorithm such as least recently used (LRU) cache replacement algorithm, or such as the cache algorithm described in U.S. patent application Ser. No. 16/256,726, entitled "CPU-Efficient Cache Replacement with Two-Phase Eviction," filed Jan. 24, 2019.

Although block cache 132 and hash table cache 136 are shown as two separate caches, the two caches 132, 136 may be a single cache. Within the single cache, the functions of block cache 132 and hash table cache 136 may be implemented using two separate data structures.

Host 105 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116 may run on top of the operating system in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine (not shown) which is a privileged virtual machine that has access to the physical hardware resources of the host and interfaces directly with physical I/O devices using device drivers that reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, instead of VMs 120, the techniques may be performed using containers that run on host 105 without the use of a hypervisor and without the use of a separate guest operating system running on each container.

Virtualization manager 130 communicates with hosts 105 via a network, shown as a management network 126, and carries out administrative tasks for data center 102 such as managing hosts 105, managing VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a virtual computing instance (e.g., a VM) in one of hosts 105. Although shown as a single unit, virtualization manager 130 may be implemented as a distributed or clustered system. That is, virtualization manager 130 may include multiple servers or virtual computing instances that implement management plane functions.

Although hosts 105 are shown as comprising a hypervisor 116 and virtual machines 120, in an embodiment, hosts 105 may comprise a standard operating system instead of a hypervisor 116, and hosts 105 may not comprise VMs 120. In this embodiment, data center 102 may not comprise virtualization manager 130.

Gateway 124 provides hosts 105, VMs 120 and other components in data center 102 with connectivity to one or more networks used to communicate with one or more remote data centers. Gateway 124 may manage external public Internet Protocol (IP) addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual appliance, a physical device, or a software module running within host 105.

Chunk store 134 comprises storages 114, tables 140, 142, and deduplication module 144. Chunk store 134 is a storage system that stores data of files 200 (see FIG. 2). The data of files 200 within chunk store 134 is deduplicated by deduplication module 144.

Deduplication module 144 may be a background process working asynchronously relative to input/output (I/O) operations directed to chunk store 134, such as asynchronously relative to I/O operations by hosts 105 or VMs 120. Deduplication module 144 may be software running within hypervisor 116, memory 110, VM 120, storage 114, or within another component of system 100. Deduplication module 144 may be a separate physical device connected to chunk store 134. Host 105 or system 100 may comprise one or more deduplication modules 144 Deduplication module 144 may be associated with a virtual node running on host 105, as described in U.S. application Ser. No. 16/552,880, incorporated by reference above.

One method of deduplication that may be used by deduplication module 144 is described in U.S. application Ser. No. 12/356,921, titled "Computer Storage Deduplication," filed on Jan. 21, 2009, the entire content of which is hereby incorporated by reference herein. The method of deduplication that may be used by deduplication module 144 may be that described in application Ser. No. 12/356,921, as modified by techniques disclosed herein.

Chunk store 134 comprises one or more storage devices 114. Although the storage devices of chunk store 134 are shown as storage devices 114 of host 105, storage devices of chunk store 134 may be any storage devices such as other storages that may be connected to host 105 through HBA 115. In an embodiment, chunk store 134 may be a distributed storage system implemented as an aggregation of storage devices 114 accessible by a plurality of hosts 105. In such a distributed storage system, chunk store 134 may be a virtual storage area network (vSAN), and hypervisor 116 may comprise a vSAN module (not shown), as described in U.S. application Ser. No. 14/010,247, titled "Distributed Policy-Based Provisioning and Enforcement for Quality of Service," filed on Aug. 26, 2013, now U.S. Pat. No. 9,887,924, the entire content of which is hereby incorporated by reference herein.

Figure 2:
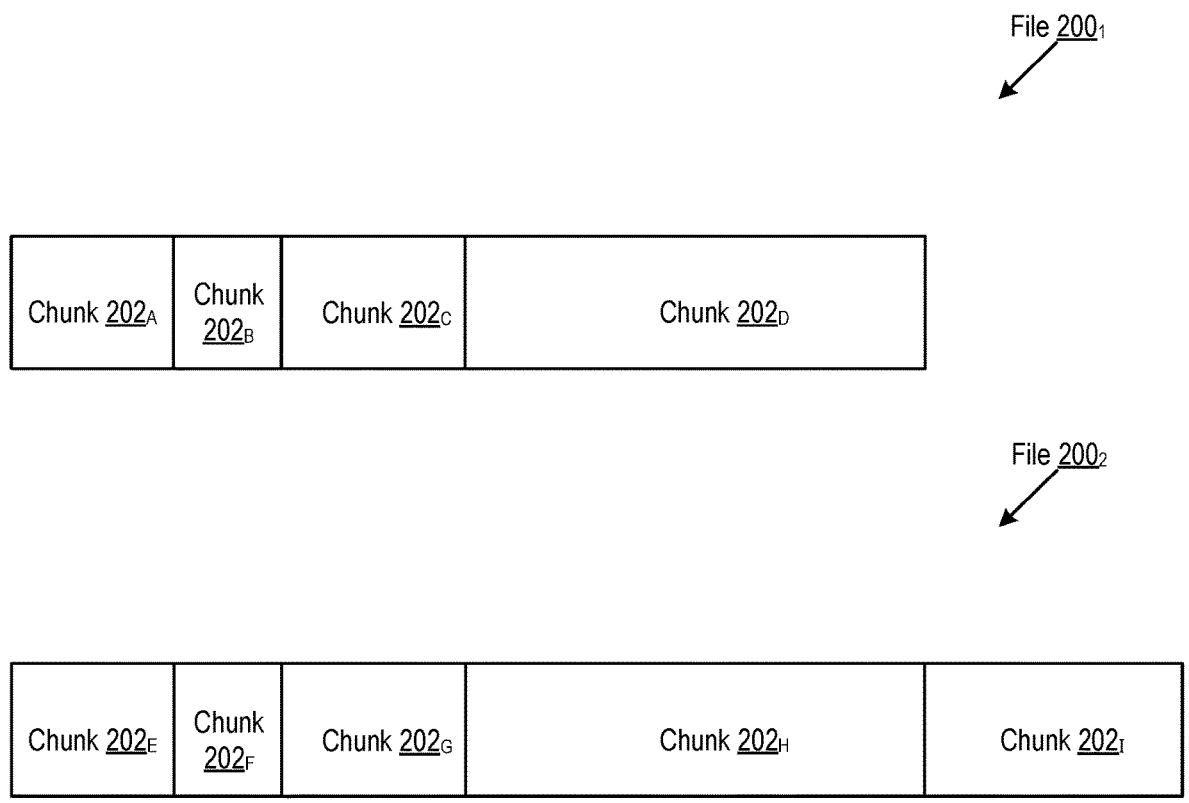
FIG. 2 depicts a block diagram of two exemplary files, according to an embodiment.

FIG. 2 depicts a block diagram of two exemplary files 200, according to an embodiment. Storage devices 114 of chunk store 134 store files 200. Each file 200 is divided into portions or chunks 202. In an embodiment, deduplication performed herein is byte-level deduplication. With byte-level deduplication, file 200 may be divided into chunks 202 by the following exemplary process. Deduplication module 144 chooses a small window size and computes a hash for a byte window starting at every byte offset of file 200. This can be done efficiently using Rabin fingerprints. If the hash matches a fixed value (e.g., zero), deduplication module 144 considers that file offset to be a boundary. Such a boundary is called a content-based boundary. A chunk 202 may be defined to be the file data between two boundaries. A boundary may also be the start and end of file 200.

Deduplication module 144 then computes a second hash for each chunk 202, and this is the hash that is checked against and inserted into chunk store data structures 140 and 142, as further described below. The second hash may be computed by, for example, a hash algorithm such as secure hash algorithm (SHA)-256 or SHA-512. In an embodiment, the computed hash may be truncated, and the truncated hash is the second hash that is associated with a chunk 202, as further described with reference to FIG. 3, below.

A benefit of such a method of dividing a file 200 into chunks 202 is that, if data in file 200 shifted (e.g., a new line is inserted at the beginning of file 200), most chunks 202 in file 200 are not affected. Such boundary setting may result in the detection of more duplicated content and may achieve increased storage space saving via deduplication. The average size of chunk 202 may be, for example, approximately 80 KB. Chunks 202 may be of different sizes.

Returning to FIG. 1A, chunk store 134 also comprises two data structures: chunk hash table 140 and chunk ID table 142. Although chunk hash table 140 and chunk ID table 142 are described as "tables," these two data structures may be any data structure that can perform the functions of chunk hash table 140 and chunk ID table 142. Chunk hash table 140 and chunk ID table 142 may not be the same data structure. For example, the two data structures may be an log structured merge (LSM) tree, a $B^\epsilon$ tree, or a B+tree. Chunk hash table 140 may be implemented as a file directory with each entry in chunk hash table being a file, as further described in U.S. application Ser. No. 16/552,880, incorporated by reference above.

Figure 1C:
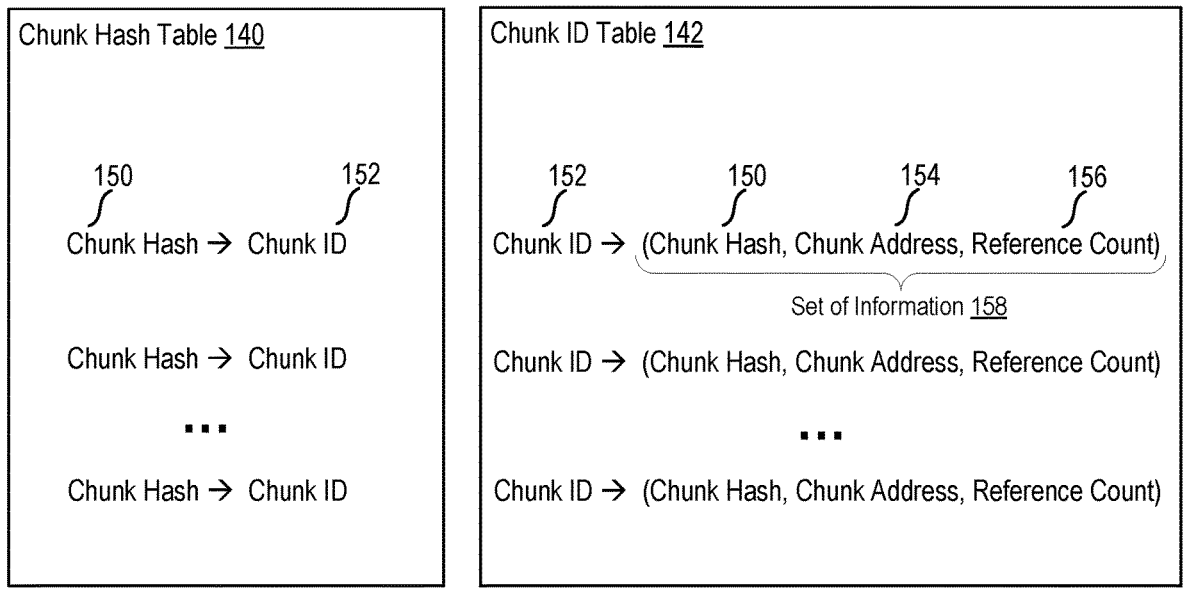
FIG. 1C depicts a block diagram of an exemplary chunk hash table and an exemplary chunk ID table, according to an embodiment.

Chunk hash table 140 is shown in detail in FIG. 1C. Chunk hash table 140 is a key-value data structure that, when given a key, returns a value that is mapped to that key. The key-value mappings are mappings from the key to the value. Chunk hash table 140 includes key-value mappings, each mapping being between (a) the key, which is the hash of the contents of chunk 202 (i.e., chunk hash 150), and (b) the value, which is a chunk identifier (ID) 152. Chunk ID 152 is an arbitrarily assigned alphanumeric identifier that preserves locality and sequential order of chunks 202 of file 200. For example, chunk 202d of file 200, may be assigned the arbitrary chunk ID of "650." Chunk 202g may then be assigned the next sequential, contiguous chunk ID, such as "651." Chunk 202c may be assigned a chunk ID of "652," etc. It should be noted that "contiguous" may be defined in arbitrary increments within system 100. For example, contiguity may be defined in increments of 0.5 or 10. If contiguity is defined in increments of 0.5, then after chunk ID "650," the next contiguous chunk ID is "650.5." If contiguity is defined in increments of 10, then after chunk ID "650," the next contiguous chunk ID is "660." Chunk IDs 152 may be sourced from a reserved batch of contiguous chunk IDs 152, as discussed in U.S. application Ser. No. 16/552,880, incorporated by reference above.

Chunk ID table 142 is shown in detail in FIG. 1C. Chunk ID table 142 is a key-value data structure that, when given a key, returns a value that is mapped to that key. The key-value mappings are mappings from the key to the value. Chunk ID table 142 includes key-value mappings, each mapping being between (a) the key, which is chunk ID 152 (e.g., obtained from chunk hash table 140), and (b) the value, which is a set of information 158 about chunk 202 corresponding to that chunk ID 152. Set of information 158 may be considered "metadata" about chunk 202 corresponding to chunk ID 152 mapped to the set of information 158. Set of information 158 may include: chunk hash 150, a pointer 154 to the contents of chunk 202 within chunk store 134, and a reference count 156 of chunk 202. Pointer 154 to the contents of chunk 202 may include an address, such as a logical or physical address. Pointer 154 may be a plurality of pointers 154 pointing to locations of file 200 within storage(s) 114. Pointer 154 may be a plurality of pointers if, for example, file 200 is a fragmented file, stored in more than one location within storage(s) 114. In an embodiment, pointer 154 is a logical pointer 154. Reference count 156 of chunk 202 may be the number of pointers (e.g., pointers 154 and pointers of files 200) that point to the contents of chunk 202. In an embodiment, reference counts 156 may be stored in a separate data structure and created, modified, and generally managed as described in U.S. application Ser. No. 16/552,954, incorporated by reference above. Tables 140 and 142 may be regarded as containing "metadata" of the content or data of chunks 202.

Figure 3:
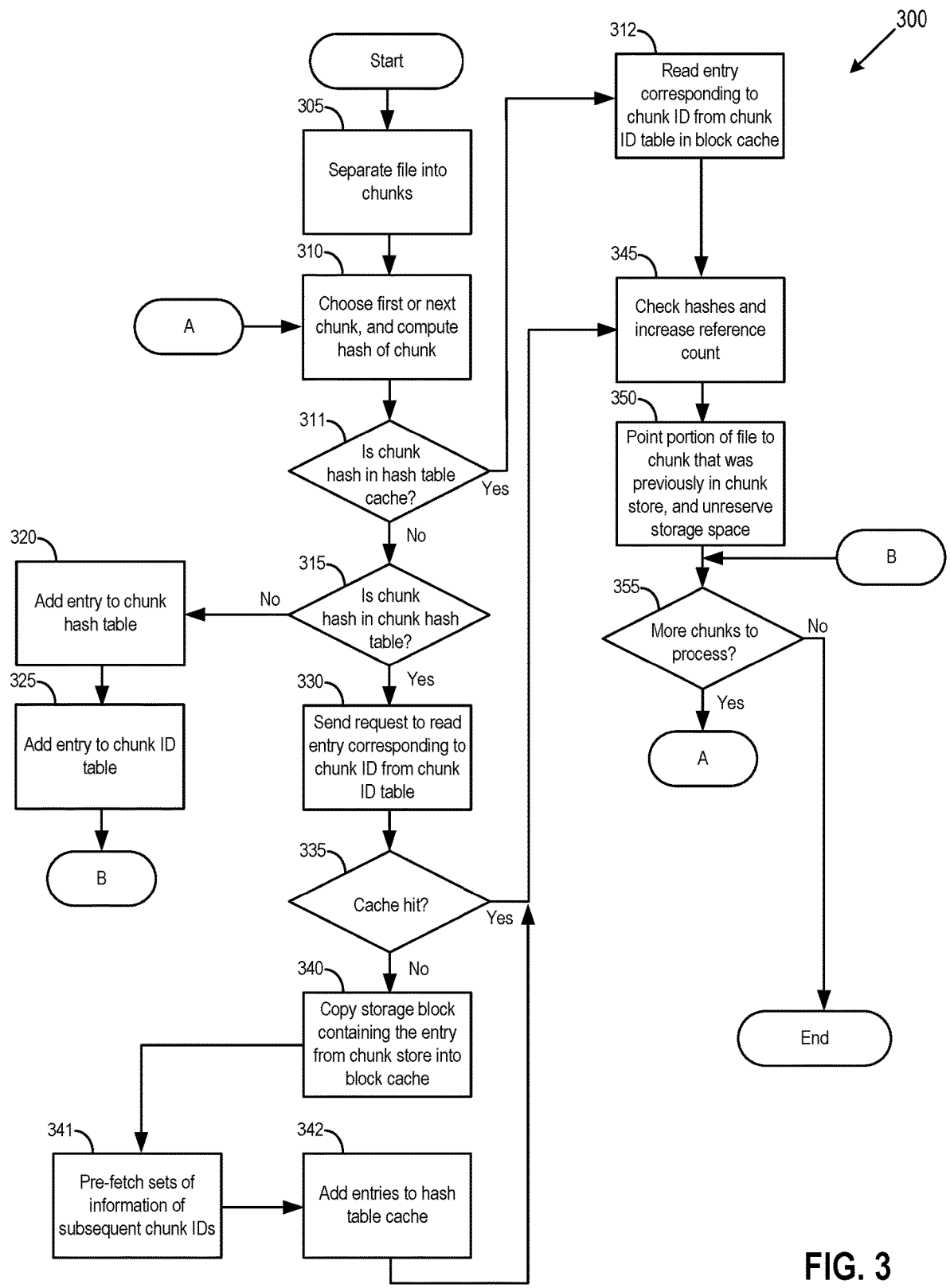
FIG. 3 depicts a flow diagram of a method of deduplicating a file, according to an embodiment.

FIG. 3 depicts a flow diagram of a method 300 of deduplicating a file 200, according to an embodiment. Method 300 may be performed by deduplication module 144. Method 300 may be performed in the background, asynchronously relative to I/O operations directed to chunk store 134. Method 300 may be triggered when deduplication module 144 identifies within chunk store 134 a new file 200 that has not been previously deduplicated. Method 300 may be triggered when deduplication module 144 identifies within chunk store 134 a file 200 that has been updated recently but has not been updated for a threshold length of time. The threshold length of time may be, for example, 24 hours. "Recently" may mean a time range that is between (a) the time that the file was last updated, and (b) the current time.

At step 305, deduplication module 144 creates boundaries within file 200 so as to divide file 200 into chunks 202. Step 305 may be performed by a process that includes Rabin fingerprinting, as described above with reference to FIG. 2.

At step 310, deduplication module 144 chooses a first or next chunk 202 for processing in subsequent steps of method 300. If step 310 is reached from step 305, then method 300 has just began its first iteration, and so deduplication module 144 chooses the first chunk 202 of file 200. If step 310 is reached from step 355, then method 300 is restarting a new iteration, and so deduplication module 144 chooses the next chunk 202 of file 200.

As part of step 310, deduplication module 144 computes a hash of the data of chosen chunk 202. The hash may be computed by, for example, SHA-256 or SHA-512. In an embodiment, the computed hash may be truncated (e.g., a SHA-512 hash may be truncated to 256 bits), and the truncated hash is the hash that is "computed at step 310" for subsequent steps of method 300.

At step 311, deduplication module 144 determines whether the hash of chunk 202, computed at step 310, is in hash table cache 136 of memory 110. If so, then the set of information 158 associated (through chunk ID 152) with the computed hash is already in block cache 132, as further explained below. Also if so, then method 300 continues to step 312. Otherwise, method 300 continues to step 315.

At step 315, deduplication module 144 determines whether the hash of chunk 202, computed at step 310, is in chunk hash table 140. If so, then the identical contents of chunk 202 have been previously processed by deduplication module 144, such as for example as part of a previous execution of method 300. Also if so, then a chunk identical to chunk 202 is already present within chunk store 134. If identical contents of chunk 202 have been previously processed, then an entry for hash 150 and chunk ID 152 for contents of chunk 202 already exist within chunk hash table 140, the entry having been added by a previous execution of method 300. If the hash of chunk 202 is in chunk hash table 140, then method 300 continues to step 330. Optionally, if the hash of chunk 202 is in chunk hash table 140, then as part of step 315, deduplication module 144 extracts chunk ID 152 from chunk hash table 140.

If the hash of chunk 202 is not in chunk hash table 140, then the contents of chunk 202 have not been previously deduplicated through the processing of method 300, and method 300 proceeds to step 320.

It should be noted that if the hash of chunk 202 is found within chunk hash table 140, then as part of step 315, a storage block from chunk store 134 is copied into block cache 132. The storage block contains the chunk ID 152 mapped to the hash of chunk 202 (chunk hash 150), chunk address 154, and reference count 156. The chunk ID 152 corresponds to an entry of chunk hash table 140. The storage block in chunk ID table 142 may also contain additional contiguous chunk hashes 150 of chunks.

Copying a storage block of chunk hash table 140 into memory 110 is expensive in the sense that the copying takes relatively more time and resources of host 105 than obtaining the same information directly from memory 110. Further, the copied block is unlikely to contain chunk IDs of subsequent chunks of file 200 being deduped, because chunk hashes 150 are random, which means that chunk IDs 152 are randomly organized within chunk hash table 140. The chunk IDs 152 of contiguous chunks 202 are not likely to be stored within the same storage block of chunk hash table 140. The cost of copying a storage block for each access of chunk hash table 140 may be avoided for subsequent chunks 202 of file 200 that is being deduped. The cost may be avoided for subsequent chunks 202 by pre-fetching and adding entries into hash table cache 136, as further explained below at steps 341 and 342.

At step 320, deduplication module 144 adds an entry for chunk 202 to chunk hash table 140. As discussed above, an entry in chunk hash table 140 includes a key-value mapping between (a) the key, which is the hash of the contents of chunk 202 (i.e., chunk hash 150), and (b) the value, which is a chunk ID 152. Chunk hash 150 was computed at step 310. Chunk ID 152 is assigned to chunk 202 as described above with reference to FIG. 2. If chunk 202 chosen at step 310 is the first chunk 202 of a file (e.g., chunk $202_A$ of file $200_1$), then chunk ID 152 may be assigned arbitrarily. If chunk 202 chosen at step 310 is a second or subsequent chunk 202 (e.g., chunk $202_B$ of file $200_1$), then chunk ID may be the next sequential identifier after chunk ID 152 assigned to the previous chunk 202. Previous chunk 202 may be, for example, chunk $202_A$ of file $200_1$.

At step 325, deduplication module 144 adds an entry for chunk 202 to chunk ID table 142. As described above, an entry in chunk ID table 142 includes a key-value mapping between (a) the key, which is the chunk ID 152 assigned at step 320, and (b) the value, which is a set of information 158 about chunk 202 corresponding to that chunk ID 152. As part of step 325, reference count 156 is modified to indicate that a reference to chunk 202 exists in chunk ID table 142 and in file 200 being deduped. In an embodiment, the reference count is set to or incremented by one. As part of step 325, the storage block to which an entry for chunk 202 is added is copied or fetched from one of storages 114 into cache 132. This copying of the storage block into memory 110 may be an automatic part of caching and swapping operations performed by hypervisor 116, an operating system of host 105, and/or a guest operating system of VM 120. After step 325, method 300 continues to step 355.

At step 330, deduplication module 144 uses chunk ID 152 extracted from chunk hash table 140 at step 315 to send a request to obtain set of information 158 about chunk 202. The set of information 158 is requested from chunk ID table 142. Deduplication module 144 uses chunk ID 152 as a key into chunk ID table 142. The value returned (at step 330 or a subsequent step) is the set of information 158 about chunk 202. Deduplication module 144 first checks whether the set of information 158 is in block cache 132 before checking storage 114 of chunk store 134.

At step 335, deduplication module 144 determines whether the set of information 158 is in block cache 132. If so, then method 300 skips step 340 and continues to step 345. If not, then method 300 continues to step 340.

At step 340, the storage block on which the set of information 158 is stored is copied or fetched from one of storages 114 into block cache 132. As part of step 340, deduplication module 144 obtains from block cache 132 the set of information 158 associated with chunk 202. This copying of the storage block into memory 110 may be an automatic part of caching and swapping operations performed by hypervisor 116, an operating system of host 105, and/or a guest operating system of VM 120.

In an embodiment, when the storage block containing the set of information corresponding to a given chunk ID is copied from storage 114 to block cache 132, the contents of the chunks 202 (that correspond to chunk IDs 152 in the storage block) are not copied into block cache 132.

It should be noted that the entries in chunk ID table 142 are arranged or organized by sequential and contiguous chunk IDs 152. The entries of chunk ID table 142 may be stored sequentially and contiguously in storage 114. This means that a storage block containing the set of information 158 corresponding to a given chunk ID 152 is likely to also store the sets of information 158 corresponding to a plurality of chunk IDs 152 that are before and/or after the given chunk ID 152. The sets of information 158 within the storage block may be arranged contiguously with one another (in an embodiment, unseparated by other data), in an order that matches the order of associated chunk IDs 152. For example, if a storage block stores the set of information corresponding to chunk ID 152 of chunk $202_B$ of file $200_1$, then that same storage block is likely to also store the set of information corresponding to the chunk IDs 152 of chunks $202_A$, $202_C$, and $202_D$.

The advantage of preserving locality by organizing sets of information 158, within chunk ID table 142, by sequential and contiguous chunk IDs 152, is illustrated with respect to the following example. Assume file $200_1$ has already been deduped and file $200_2$ is in the process of being deduped by method 300. As used herein, the terms "deduped" and "deduplicated" are synonymous, and mean "having gone through a process of deduplication." Assume that at step 315, the hash of chunk $202_E$ of file $200_2$ is determined to already be within chunk hash table 140, meaning that a chunk identical to $202_E$ is already in chunk store 134. Assume that this previously deduped and identical chunk 202 is chunk $202_A$ of file $200_1$. It is likely that after chunk $202_A$, the subsequent several chunks $202_B$, $202_C$, $202_D$, etc. of file $200_1$ are the same as the several chunks following chunk $202_E$ of file $200_2$. The sets of information 158 corresponding to chunks $202_B$, $202_C$, and $202_D$ are likely within the same storage block as the set of information 158 of chunk $202_A$. When the storage block containing set of information 158 of chunk $202_A$ is copied into block cache 132 of memory 110, the sets of information 158 corresponding to chunks $202_B$, $202_C$, and $202_D$ are also likely copied into block cache 132. When, for example, $202_F$ of file $200_2$ is processed by method 300, the hash of the contents of chunk $202_F$ is likely to be the same as the hash of chunk $202_B$. The hash of chunk $202_B$ is already in chunk hash table 140 and chunk ID table 142 as chunk hash 150.

When the hash of chunk $202_F$ is calculated, set of information 158 corresponding to that hash is likely to already be in block cache 132, precluding a need to copy a new storage block into block cache 132 as part of an I/O operation, as illustrated by the skipping of step 340 if a cache hit occurs in step 335 of method 300. This speeds up processing and deduplication of files 200. Organizing the sets of information, within chunk ID table 142, by sequential and contiguous chunk IDs 152, preserves locality of deduped files 200. The preserved locality results in faster read operations of sets of information 158, because the read operations are executed from memory 110 rather than from storage 114.

At step 341, deduplication module 144 pre-fetches several sets of information 158 associated with chunk IDs 152, the chunk IDs 152 being subsequent and contiguous to the chunk ID 152 that was within the set of information 158 requested at step 330. "Several" may be a number appropriate for system 100, such as for example, 10, 100, 1000, or 10000 sets of information 158.

At step 341, the storage block(s) on which the pre-fetched sets of information 158 is stored is copied or fetched from one of storages 114 into block cache 132. The copying of the storage block into memory 110 may be an automatic part of caching and swapping operations performed by hypervisor 116, an operating system of host 105, and/or a guest operating system of VM 120. Steps 341 and 342 may be performed in sequence for each pre-fetched set of information 158, such that steps 341 and 342 are looped for each pre-fetched set of information. Pre-fetching may be performed by requesting, from chunk ID table 142, a set of information 158 associated with a chunk ID 152. The request may be satisfied from block cache 132 without performing an I/O on storage 114. Or the request may be satisfied by requesting the set of information 158 from block cache 132, receiving a cache miss, and then copying a storage block that has the requested set of information 158 into block cache 132, and providing the requested set of information 158.

Step 341 is illustrated by the following example. Assume that the set of information 158 obtained in steps 330 through 340 pertains to chunk $202_A$, and that chunk $202_A$ has a chunk ID of "100." At step 341, deduplication module 144 pre-fetches sets of information 158 associated with subsequent and contiguous chunk IDs "101," "102," "103," etc. (assuming contiguity is defined in increments of 1).

It was discussed above, with reference to step 340, that contiguous sets of information 158 are already likely automatically brought into block cache 132 in step 340. However, bringing the contiguous sets of information 158 into block cache 132 is not guaranteed, so pre-fetching guarantees that these subsequent and contiguous sets of information 158 are within block cache 132 of memory 110.

At step 342, deduplication module 144 adds key-value mappings to hash table cache 136. The keys added are the chunk hashes 150 from the sets of information 158 pre-fetched at step 341. The mapped values added are the chunk IDs 152 associated with the chunk hashes 150.

In other words, deduplication module 144 reconstructs a subset of chunk hash table 140 within hash table cache 136. By reconstructing such mappings, step 315 above is avoided, and method 300 continues from step 311 to step 312. This means that the copying of a storage block of step 315 is also avoided, saving time and resources of host 105. The copying of a storage block of step 315 is likely avoided because hashes of contents of subsequently processed chunks 202 will likely be in memory 110 for several subsequent and contiguous chunks 202 after the chunk 202 being processed by method 300. The added key-value mappings of hash table cache 136 may preclude copying a separate storage block from chunk store 134 into memory 110 for each chunk 202 of file 200 being deduplicated by method 300.

Step 342 is illustrated by the following example. Assume that sets of information 158 associated with chunk IDs "101," "102," and "103" were pre-fetched at step 341. Assume that chunk IDs "101," "102," and "103" are associated with chunks $202_B$, $202_C$, and $202_D$, respectively.

Assume also that chunks $202_B$, $202_C$, and $202_D$ have the same contents as chunks $202_F$, $202_G$, and $202_H$ of file $200_2$, and assume that file $200_2$ is currently being deduped by method 300.

Continuing the example, at step 342, for each chunk ID "101," "102," and "103," deduplication module 144 obtains chunk hash 150 associated with that chunk ID 152. Then deduplication module 144 creates an entry within hash table cache 136, for each chunk ID "101," "102," and "103," mapping chunk hash 150 to chunk ID 152. When deduplication module 144 processes chunks $202_F$, $202_G$, and $202_H$ in subsequent iterations of method 300, deduplication module 144 will find hashes of contents of chunks $202_F$, $202_G$, and $202_H$ within hash table cache 136 of memory 110, precluding the need to access chunk hash table 140 and chunk store 134 when determining mappings between chunk hash 150 and chunk ID 152.

At step 312 (reached from step 311), deduplication module 144 uses chunk ID 152 extracted from hash table cache 136 to obtain a set of information 158 about chunk 202. The set of information is obtained from chunk ID table 142. Deduplication module 144 uses chunk ID 152 as a key into chunk ID table 142. The value returned is the set of information 158 about chunk 202. It should be noted that the set of information 158 is likely retrieved from cache 132 because if hash of chunk 202 is present in hash table cache 136, then the set of information 158 of chunk 202 was likely recently pre-fetched at step 341 of a previous iteration of method 300.

At step 345, deduplication module 144 checks that the hash calculated at step 310 is the same as chunk hash 150 within the obtained set of information 158. If not, then method 300 may abort and an administrator may be notified. If the hashes match, then deduplication module 144 performs a write to the storage block copied into cache at step 340. The write increases reference count 156, within the set of information 158, by one. The increase by one indicates that the portion of file 200 corresponding to chunk 202 chosen at step 310 is now pointing to the chunk 202 that had already been in chunk store 134 (and whose set of information 158 was obtained at previous steps).

At step 350, a deduplication module 144 or a garbage collection module (not shown) unreserves storage space within storage 114. The unreserved storage space corresponds to the space where chunk 202 chosen at step 310 is stored. The freeing or unreserving of storage blocks may be performed as described by U.S. application Ser. No. 16/552,880, incorporated by reference above. As part of step 350, the portion of file 200 that previously pointed to chunk 202 chosen at step 310 is remapped to point at shared chunk 202 that had already been in chunk store 134, and whose set of information 158 was retrieved at steps 330-340 or at step 312. As used herein, a "shared chunk" 202 is a chunk that is referenced by more than one file 200.

As part of step 350, memory pages corresponding to shared chunk 202, whose set of information 158 was retrieved at steps 330-340 or at step 312, are marked as copy-on-write (COW). Marking pages as COW may be performed by hypervisor 116 or an operating system of host 105 or VM 120. Step 350 may be performed before, concurrently, or after step 345.

At step 355, deduplication module 144 determines whether more chunks 202 of file 200 (of step 305) need to be processed by method 300. If so, method 300 returns to step 310. Otherwise, method 300 ends.

Figure 4:
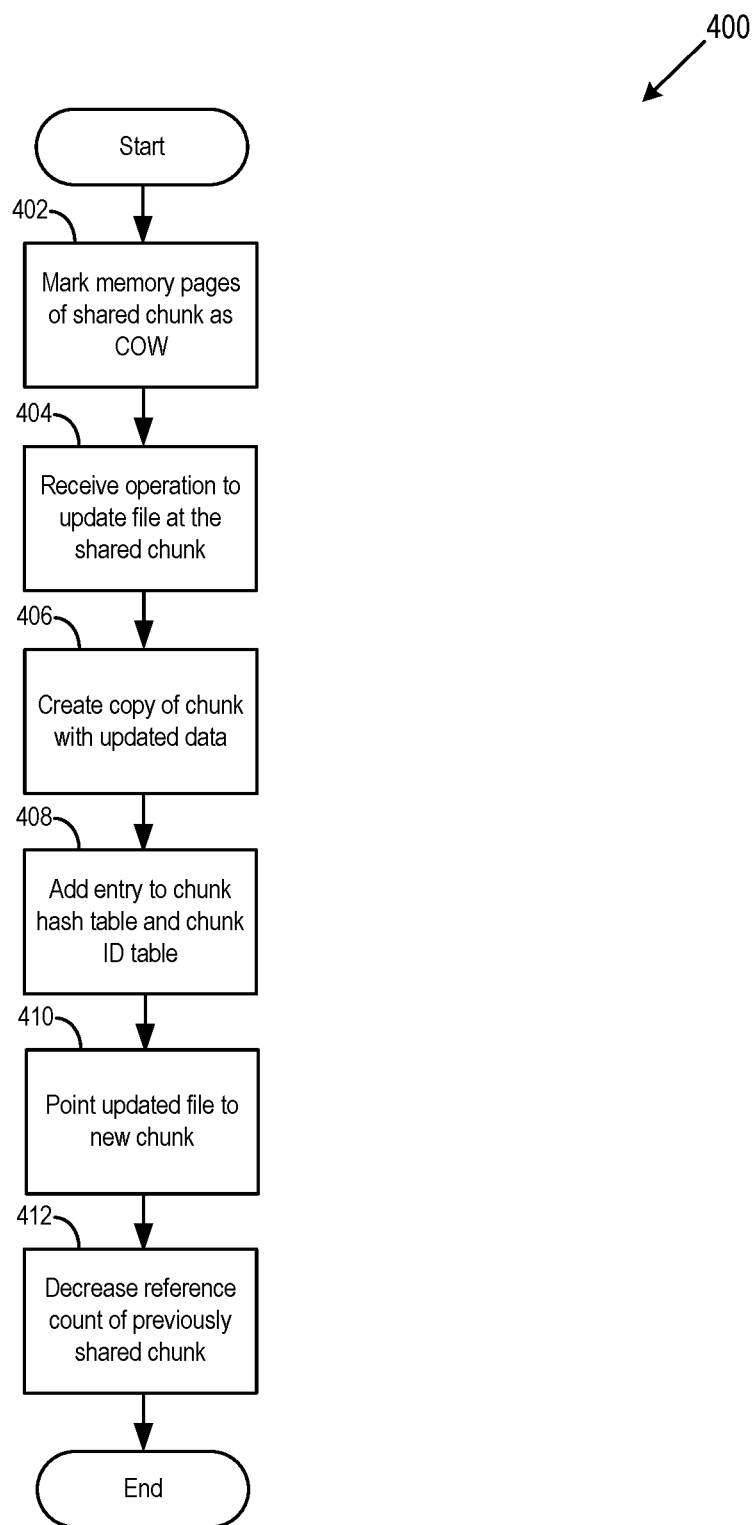
FIG. 4 depicts a flow diagram of a method of updating a file that has been previously deduped, according to an embodiment.

FIG. 4 depicts a flow diagram of a method 400 of updating a file 200 that has been previously deduped, according to an embodiment. Method 400 may be performed by deduplication module 144, hypervisor 116, an operating system of host 105 or VM 120, or a combination of these components. The file 200 that has been previously deduped may have been deduped by method 300.

At step 402, deduplication module 144 (or hypervisor 116 or an operating system of host 105 or VM 120) marks memory pages of a shared chunk 202 as COW. Step 402 may be performed as part of method 300, such as part of step 350 of method 300.

At step 404, chunk store 134 or hypervisor 116 receives an operation to update a file 200 that references the shared chunk 202, and the update operation is directed at contents of shared chunk 202.

At step 406, chunk store 134 or hypervisor 116 creates a copy of shared chunk 202, the copy being a new chunk 202 with updated data, as per the update operation of step 404.

At step 408, an entry for new chunk 202 is added to chunk hash table 140, similarly to the process of step 320 of method 300. Also as part of step 408, an entry for new chunk 202 is added to chunk ID table 142, similarly to the process of step 325 of method 300.

At step 410, the portion of updated file 200 that previously pointed to shared chunk 202 is remapped to point to new chunk 202. Because file 200 is remapped to a new chunk, shared chunk 200 may no longer be a "shared chunk" at step 410. As part of step 410 or as part of another step of method 400, the memory pages of previously shared chunk 202 may be unmarked COW.

At step 412, deduplication module 144 decreases the reference count of the shared chunk or previously shared chunk 202 by one. After step 412, method 400 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory, persistent memory, solid state disk (e.g., a flash memory device), NVMe device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of deduplicating a file, the file comprising a first chunk, the method comprising:
   determining if a first hash of a first content of the first chunk is in a cache of a chunk hash data structure, wherein the chunk hash data structure comprises a first plurality of key-value mappings between a first plurality of keys and first plurality of values, the first plurality of keys each being a hash of a content of a corresponding chunk, and the first plurality of values each being a chunk ID of the corresponding chunk; and
   if the first hash is not in the cache:
     determining a first chunk ID of the first chunk;
     determining a plurality of chunk IDs that are subsequent and contiguous to the first chunk ID by incrementing a value of the first chunk ID, wherein the first chunk ID and the plurality of chunk IDs comprise a set of contiguous alphanumeric values defined in increments of a constant increment;
     for each chunk ID of the plurality of chunk IDs, obtaining a set of information corresponding to the chunk ID of the plurality of chunk IDs based on a chunk ID data structure, wherein the chunk ID data structure comprises a second plurality of key-value mappings between a second plurality of keys and a second plurality of values, the second plurality of keys being the chunk IDs of the chunk hash data structure, and the second plurality of values each being a corresponding set of information about the corresponding chunk, wherein each set of information comprises the hash of the content of the corresponding chunk and a pointer to the content of the corresponding chunk, the pointer including an address of the corresponding chunk, wherein the address is different than a chunk ID of the corresponding chunk;
     generating first plurality of key-value mappings for each of the plurality of chunk IDs using the obtained sets of information; and
     storing the generated first plurality of key-value mappings as entries in the cache.

2. The method of claim 1, wherein the determining the first chunk ID of the first chunk is performed by accessing the chunk hash data structure.

3. The method of claim 1, wherein at least a portion of the sets of information of the chunk ID data structure are stored in order of corresponding chunk IDs in a storage block of a storage, wherein the storage block is cached in a second cache, and wherein obtaining the sets of information corresponding to the chunk IDs of the plurality of chunk IDs comprises obtaining the portion of the sets of information from the second cache.

4. The method of claim 1, further comprising, if the first hash is not in the cache:
   determining if the first hash is in the chunk hash data structure; and
   if the first hash is in the chunk hash data structure:
      determining a first set of information of a second chunk by mapping the first chunk ID to the first set of information using the chunk ID data structure, the first set of information including a second pointer to second content of the second chunk; and
      modifying a first pointer in a first file corresponding to the first chunk to point to the second content of the second chunk.

5. The method of claim 1, further comprising, if the first hash is in the cache:
   determining, from the cache, the first chunk ID of the first chunk;
   reading, from the chunk ID data structure, a first set of information of a second chunk by mapping the first chunk ID to the first set of information using the chunk ID data structure, the first set of information including a second pointer to second content of the second chunk; and
   modifying a first pointer in a first file corresponding to the first chunk to point to the second content of the second chunk.

6. The method of claim 1, wherein each set of information further comprises a reference count of the corresponding chunk.

7. The method of claim 1, wherein the chunk hash data structure is stored in storage with entries in order of the first plurality of keys.

8. A non-transitory computer readable medium comprising instructions to be executed in a processor of a computer system, the instructions when executed in the processor cause the computer system to carry out a method of deduplicating a file, the file comprising a first chunk, the method comprising:
   determining if a first hash of a first content of the first chunk is in a cache of a chunk hash data structure, wherein the chunk hash data structure comprises a first plurality of key-value mappings between a first plurality of keys and first plurality of values, the first plurality of keys each being a hash of a content of a corresponding chunk, and the first plurality of values each being a chunk ID of the corresponding chunk; and
   if the first hash is not in the cache:
      determining a first chunk ID of the first chunk;
      determining a plurality of chunk IDs that are subsequent and contiguous to the first chunk ID by incrementing a value of the first chunk ID, wherein the first chunk ID and the plurality of chunk IDs comprise a set of contiguous alphanumeric values defined in increments of a constant increment;
      for each chunk ID of the plurality of chunk IDs, obtaining a set of information corresponding to the chunk ID of the plurality of chunk IDs based on a chunk ID data structure, wherein the chunk ID data structure comprises a second plurality of key-value mappings between a second plurality of keys and a second plurality of values, the second plurality of keys being the chunk IDs of the chunk hash data structure, and the second plurality of values each being a corresponding set of information about the corresponding chunk, wherein each set of information comprises the hash of the content of the corresponding chunk and a pointer to the content of the corresponding chunk, the pointer including an address of the corresponding chunk, wherein the address is different than a chunk ID of the corresponding chunk;
      generating first plurality of key-value mappings for each of the plurality of chunk IDs using the obtained sets of information; and
      storing the generated first plurality of key-value mappings as entries in the cache.

9. The non-transitory computer readable medium of claim 8, wherein the determining the first chunk ID of the first chunk is performed by accessing the chunk hash data structure.

10. The non-transitory computer readable medium of claim 8, wherein at least a portion of the sets of information of the chunk ID data structure are stored in order of corresponding chunk IDs in a storage block of a storage, wherein the storage block is cached in a second cache, and wherein obtaining the sets of information corresponding to the chunk IDs of the plurality of chunk IDs comprises obtaining the portion of the sets of information from the second cache.

11. The non-transitory computer readable medium of claim 8, the method further comprising, if the first hash is not in the cache:
   determining if the first hash is in the chunk hash data structure; and
   if the first hash is in the chunk hash data structure:
      determining a first set of information of a second chunk by mapping the first chunk ID to the first set of information using the chunk ID data structure, the first set of information including a second pointer to second content of the second chunk; and
      modifying a first pointer in a first file corresponding to the first chunk to point to the second content of the second chunk.

12. The non-transitory computer readable medium of claim 8, the method further comprising, if the first hash is in the cache:
   determining, from the cache, the first chunk ID of the first chunk;
   reading, from the chunk ID data structure, a first set of information of a second chunk by mapping the first chunk ID to the first set of information using the chunk ID data structure, the first set of information including a second pointer to second content of the second chunk; and
   modifying a first pointer in a first file corresponding to the first chunk to point to the second content of the second chunk.

13. The non-transitory computer readable medium of claim 8, wherein each set of information further comprises a reference count of the corresponding chunk.

14. The non-transitory computer readable medium of claim 8, wherein the chunk hash data structure is stored in storage with entries in order of the first plurality of keys.

15. A computer system comprising:
   a file;
   a chunk hash data structure;

a chunk ID data structure; and at least one processor, wherein the at least one processor is programmed to carry out a method of deduplicating the file, the file comprising a first chunk, the method comprising:

determining if a first hash of a first content of the first chunk is in a cache of the chunk hash data structure, wherein the chunk hash data structure comprises a first plurality of key-value mappings between a first plurality of keys and first plurality of values, the first plurality of keys each being a hash of a content of a corresponding chunk, and the first plurality of values each being a chunk ID of the corresponding chunk; and if the first hash is not in the cache:

determining a first chunk ID of the first chunk;

determining a plurality of chunk IDs that are subsequent and contiguous to the first chunk ID by incrementing a value of the first chunk ID, wherein the first chunk ID and the plurality of chunk IDs comprise a set of contiguous alphanumeric values defined in increments of a constant increment;

for each chunk ID of the plurality of chunk IDs, obtaining a set of information corresponding to the chunk ID of the plurality of chunk IDs based on the chunk ID data structure, wherein the chunk ID data structure comprises a second plurality of key-value mappings between a second plurality of keys and a second plurality of values, the second plurality of keys being the chunk IDs of the chunk hash data structure, and the second plurality of values each being a corresponding set of information about the corresponding chunk, wherein each set of information comprises the hash of the content of the corresponding chunk and a pointer to the content of the corresponding chunk, the pointer including an address of the corresponding chunk, wherein the address is different than a chunk ID of the corresponding chunk;

generating first plurality of key-value mappings for each of the plurality of chunk IDs using the obtained sets of information; and storing the generated first plurality of key-value mappings as entries in the cache.

16. The computer system of claim 15, wherein the determining the first chunk ID of the first chunk is performed by accessing the chunk hash data structure.

17. The computer system of claim 15, wherein at least a portion of the sets of information of the chunk ID data structure are stored in order of corresponding chunk IDs in a storage block of a storage, wherein the storage block is cached in a second cache, and wherein obtaining the sets of information corresponding to the chunk IDs of the plurality of chunk IDs comprises obtaining the portion of the sets of information from the second cache.

18. The computer system of claim 15, the method further comprising, if the first hash is not in the cache:

determining if the first hash is in the chunk hash data structure; and if the first hash is in the chunk hash data structure:

determining a first set of information of a second chunk by mapping the first chunk ID to the first set of information using the chunk ID data structure, the first set of information including a second pointer to second content of the second chunk; and modifying a first pointer in a first file corresponding to the first chunk to point to the second content of the second chunk.

19. The computer system of claim 15, the method further comprising, if the first hash is in the cache:

determining, from the cache, the first chunk ID of the first chunk;

reading, from the chunk ID data structure, a first set of information of a second chunk by mapping the first chunk ID to the first set of information using the chunk ID data structure, the first set of information including a second pointer to second content of the second chunk; and modifying a first pointer in a first file corresponding to the first chunk to point to the second content of the second chunk.

20. The computer system of claim 15, wherein each set of information further comprises a reference count of the corresponding chunk.

* * * * *